United States Patent
Gneuss et al.

(10) Patent No.: US 9,486,723 B2
(45) Date of Patent: Nov. 8, 2016

(54) METHOD AND DEVICE FOR OPERATING A SCREEN WHEEL FILTER

(71) Applicant: GNEUSS GmbH, Bad Oeynhausen (DE)

(72) Inventors: Detlef Gneuss, Bad Oeyhausen (DE);
Stephan Gneuss, Bad Oeyhausen (DE);
Daniel Gneuss, Charlotte (DE)

(73) Assignee: GNEUSS GMBH, Bad Oeynhausen (DE)

( * ) Notice: Subject to any disclaimer, the term of this patent is extended or adjusted under 35 U.S.C. 154(b) by 0 days.

(21) Appl. No.: 14/774,180

(22) PCT Filed: May 8, 2014

(86) PCT No.: PCT/EP2014/059429
§ 371 (c)(1),
(2) Date: Sep. 10, 2015

(87) PCT Pub. No.: WO2014/180946
PCT Pub. Date: Nov. 13, 2014

(65) Prior Publication Data
US 2016/0051915 A1     Feb. 25, 2016

(30) Foreign Application Priority Data

May 10, 2013   (DE) .......................... 10 2013 208 628

(51) Int. Cl.
| | |
|---|---|
| *B01D 37/04* | (2006.01) |
| *B29C 37/00* | (2006.01) |
| *B01D 33/80* | (2006.01) |
| *B01D 33/48* | (2006.01) |
| *B01D 33/15* | (2006.01) |
| *B29C 47/92* | (2006.01) |
| *B29C 47/08* | (2006.01) |
| *B29C 47/68* | (2006.01) |

(52) U.S. Cl.
CPC ............. *B01D 33/804* (2013.01); *B01D 33/15* (2013.01); *B01D 33/48* (2013.01); *B29C 37/00* (2013.01); *B29C 47/0886* (2013.01); *B29C 47/683* (2013.01); *B29C 47/92* (2013.01); *B29C 2037/96* (2013.01); *B29C 2947/9259* (2013.01); *B29C 2947/9299* (2013.01); *B29C 2947/92695* (2013.01); *B29C 2947/92961* (2013.01)

(58) Field of Classification Search
None
See application file for complete search history.

(56) References Cited

U.S. PATENT DOCUMENTS

| | | |
|---|---|---|
| 5,200,077 A | 4/1993 | NcNeice |
| 6,843,915 B2 | 1/2005 | Gneuss |

(Continued)

*Primary Examiner* — Robert James Popovics
(74) *Attorney, Agent, or Firm* — Andrew Wilford

(57) ABSTRACT

The invention relates to a method and a device for operating a screen wheel filter for highly viscous melts having pressures >10 bar and temperatures >90° C. which shall be further developed in such a way that less of the highly viscous melt is wasted and that the operation of the screen wheel filter can be made more economical. For this purpose the screen wheel (3) according to the invention is rotationally driven at least one complete revolution, with respect to one of the screen inserts (12) located in the melt channel (10), before the particular screen insert (12) is replaced and/or backflushed, and wherein the drive speed and drive cycling for the screen wheel (3) are set in dependence on the thermal or oxidative decomposition behavior of the particular melt in such a way that, when the particular screen insert (12) reenters the melt channel (10) of the screen wheel filter (1), the melt remaining in the particular screen insert (12) has experienced thermal decomposition or oxidative decomposition of ≤3% cleaved molecular chains, preferably ≤1% cleaved molecular chains.

10 Claims, 1 Drawing Sheet

(56) References Cited

U.S. PATENT DOCUMENTS

| | | |
|---|---|---|
| 7,215,450 B2 | 5/2007 | Schilling |
| 7,976,706 B2 | 7/2011 | Gneuss |
| 8,202,423 B2 | 6/2012 | Gneuss |
| 8,262,908 B2 | 9/2012 | Patrovsky |
| 8,540,874 B2 | 9/2013 | Patrovsky |
| 2003/0132146 A1 | 7/2003 | Gneuss |
| 2006/0157879 A1 | 7/2006 | Gneuss |
| 2014/0001111 A1 | 1/2014 | Middler |
| 2016/0051915 A1* | 2/2016 | Gneuss ............... B29C 47/0886 210/791 |

\* cited by examiner

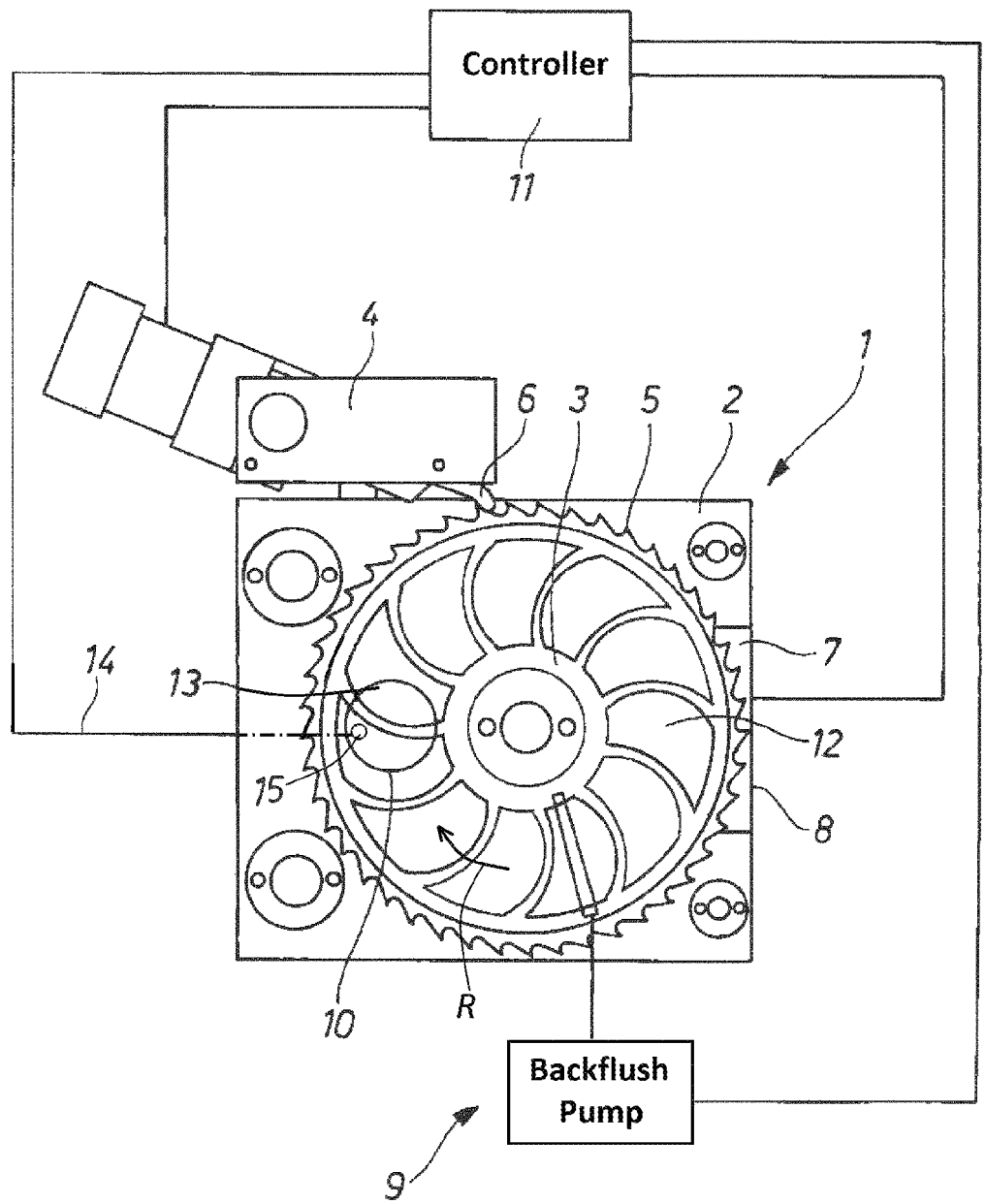

METHOD AND DEVICE FOR OPERATING A SCREEN WHEEL FILTER

CROSS REFERENCE TO RELATED APPLICATIONS

This application is the US-national stage of PCT application PCT/EP2014/059429 filed 8 May 2014 and claiming the priority of German patent application 102013208628.8 itself filed 10 May 2013.

FIELD OF THE INVENTION

The invention relates to a method of operating a screen wheel filter for a high-viscosity melt having pressures >10 bar and temperatures >90° C. and substantially comprising a screen wheel mounted in a housing and carrying at least one screen insert, the screen wheel filter comprising a melt passage offset from an insert backflushing station and/or insert changing station.

BACKGROUND OF THE INVENTION

Screen wheel filters as in for example DE 103 58 672 [U.S. Pat. No. 8,202,425] are known in the prior art. The known screen wheel filter comprises a filter-element changing station. DE 102 25 601 [U.S. Pat. No. 6,843,915] discloses a screen wheel filter that is also equipped with a backflushing station.

Screen wheel filters serve to purify a high-viscosity melt, such as from an extruder, and to feed it into a further process stage, for example an injection-molding machine, granulator or blow molder. In such screen wheel filters, the screen wheels are rotated in steps substantially dependent on degree of contamination, and the rotation, as is known from DE 199 61 426 [US 2003/0132146] or DE 103 26 487 [2006/0157879], occurs at specific time intervals in which a corresponding degree of contamination of the screen disk is expected, or occurs depending on a differential pressure signal that indicates the degree of contamination of the screen disk. Periodic, large stationary periods thus exist between the rotation steps. Together, the rotating and stationary periods are routinely so large that the melt remaining in the screen inserts experiences a substantial thermal decomposition or oxidative decomposition such that before each re-entry of a screen insert into the melt passage, for example into the changing station according to DE 103 58 672, the screen insert must be removed from the screen wheel and changed for a new screen insert, or must otherwise be backflushed and thus cleaned before entry into the melt passage, according to DE 102 25 601.

Substantial thermal decomposition or oxidative decomposition is to be here understood, for example, as a heat reduction of the molecular chain length of polymers that is so great that material that has been so altered can no longer be fed through the production flow without degrading the final product. A substantial thermal decomposition or oxidative decomposition is expected if more than 5% of the molecular chains of the respective polymer have already been split. A substantial thermal decomposition or oxidative decomposition also occurs if the main component of the plastic or the additives contained in the plastic are so greatly decomposed that the surface of the processing system is affected by the products of decomposition.

Here, the times in which a substantial thermal decomposition or oxidative decomposition occurs are dependent on material and temperature. Thermally stable polymers can be held at processing temperature for up to 60 min without the occurrence of substantial thermal decomposition or oxidative decomposition, while in thermally sensitive melts, substantial thermal decomposition or oxidative decomposition already occurs in <5 min.

In the exchange of a screen insert, the screen insert is removed from the screen wheel with the melt remaining in the screen insert, and exchanged for a new screen insert that does not yet hold any melt. The melt remaining in the removed screen insert is thereby lost to the production process.

However also during backflushing, material is removed from the already purified melt stream and pressed against the screen insert in the backflush slot. Here, the melt located in the screen inserts is exchanged for new melt. The original melt remaining in the screen inserts is disposed of on disposal of in the ejector of the screen filter. Here too, large losses of melt occur, whereby both a changing of the screen insert and a backflushing of the screen insert increase the expense of operation of the screen wheel filter.

Often, the changing of the screen insert and/or the backflushing of the screen insert takes place even though it is not contaminated, merely to prevent thermal or oxidative decomposition.

OBJECT OF THE INVENTION

The object of the invention is to improve a method of operating a screen wheel filter to the extent that less of the high-viscosity melt is wasted and that operation of the screen wheel filter may be more cost-effective.

SUMMARY OF THE INVENTION

To achieve this object, it is proposed that the screen wheel is rotationally driven at least one complete revolution, with respect to one of the screen inserts located in the melt passage, before the particular screen insert is replaced in the insert changing station and/or backflushed in the insert backflushing station, and the drive speed and drive cycling for the screen wheel are set in dependence on the thermal or oxidative decomposition behavior of the particular melt in such a way that, when the particular screen insert reenters the melt passage of the screen wheel filter, the melt remaining in the particular screen insert has experienced thermal decomposition or oxidative decomposition of ≤3% cleaved molecular chains, preferably ≤1% cleaved molecular chains.

The filter wheel is thus rotationally driven at such a rate that the melt remaining in the screen inserts can continue to be used even after one revolution of the screen wheel filter. If the screen insert is not clogged by contaminants, the screen insert may also be reused more than once. It is essential here that the melt remaining in the screen insert in the melt passage is always exchanged in a timely manner such that it can continue to be used, i.e. that it has not experienced excessive thermal or oxidative decomposition. According to the invention, this is achieved when the melt comprises ≤3% cleaved molecular chains. The determination of the number of cleaved molecular chains can occur, for example, by a comparison of the average molecular weight of the melt located in the melt passage with the average molecular weight of the melt located in the screen insert directly before further rotation of the screen insert into the melt passage, and a relationship exists between the number of cleaved molecular chains and the molecular mass, for example, an increase in the cleaved molecular chains by 1% corresponds approximately to a decrease in the molecular mass by 1%.

Thus, the screen insert must only then be changed or only then be backflushed when the screen insert is actually contaminated. Automatic replacement of the screen insert when the changing station is reached or automatic backflushing of the screen insert when the backflushing station is reached is omitted. Changing or backflushing of the screen insert occurs only when the screen insert actually is contaminated to such an extent that it can no longer be rotated into the melting passage for a further filtering process.

Many unnecessary screen insert changes and backflush processes are thus eliminated, so that considerable high-viscosity melt is saved.

In addition, due to the correspondingly rapid rotation and cycling of the screen wheels, possible surge contamination can also be quickly reacted to.

If surge contamination occurs during conventional operation of corresponding screen wheel filters, it routinely occurs when the pressure upstream of the screen insert greatly increases, and this strong pressure increase requires that the upstream extruder be switched off.

Through the relatively fast rotation of the screen wheel, a possible surge contamination may also be quickly rotated out of the melting passage and the contaminated screen insert can be exchanged for a less contaminated or new screen insert.

It has proven advantageous that the screen wheel is rotationally driven in steps by a rotary drive that ensures one revolution of the screen wheel in a time that is shorter than a time in which the melt experiences a maximum of 1% thermal or oxidative decomposition.

It is here to be taken into account that a change of the screen insert or a backflushing process, as well as the filling of the backflush system, requires a certain amount of time to complete. If during one screen-wheel rotation or during a plurality of screen-wheel rotations no changing or backflushing process takes place, a corresponding time savings arises. If, however, a changing or backflushing process occurs, the time necessary for this process must be taken into account in the setting of the rotational speed of the drive.

One possible drive, for example, is the pawl drive belonging to the prior art, for instance from DE 103 58 672, and with which large rotational speeds can be realized. However, the possibility also exists to rotationally drive the screen wheel via a freewheel driven gear as in conventional screen wheel filters, and until now drive via gear and freewheel is principally used in backflushing screen wheel filters.

It has proven useful that the rotary drive executes a rotational angle of >1°, and <10°, preferably >5°, and <10° per angular step. This ensures that a sufficiently large rotational angle is reached and the filter inserts can nevertheless remain for a sufficient time in the melt passage.

However, it has also proven useful that the exchange ratio of the active screen insert is >3%, and <10%, preferably >5%, and <10%. This ensures that the rotational movement of the screen wheel is still large enough, however, that a possible pressure drop during rotation of the following screen insert into the melt passage does not result in large fluctuations.

It is advantageous that changing of the screen insert and/or backflushing of the screen insert takes place in dependence on the contamination of the screen inserts.

Thus, each screen insert is not automatically changed or backflushed during each revolution, but rather the melt-consuming change or backflush occurs only when one of the screen inserts cannot be used for another, even if short, filtering process.

The backflushing is essentially switched off in dependence on the screen insert contamination, and only switched on as needed in the case of greater contamination. Here, for instance, only a particularly contaminated screen insert may be changed or backflushed, while the other, not yet so contaminated screen inserts are used for further filtering steps.

A screen insert change and/or a backflushing of the screen insert may occur after a specific number of cycles, for example, if the degree of contamination of the melt, and the expected degree of contamination of the screen insert is known.

The possibility also exists, however, to initiate a screen insert change and/or backflushing of the screen insert depending on a differential pressure signal. Backflushing for example for an entire revolution of the screen wheel, or even only for a fixed number of cycles or for a determined duty cycle, is only switched on when the differential pressure exceeds a certain, for example predetermined, value. Of course, the backflushing may be initiated only for the exact screen inserts in which a too-high differential pressure was measured.

The object of the invention is achieved according to the device with a screen wheel filter comprising a screen wheel carrying at least one screen insert and that is rotatably mounted and closed in a housing that is closed with the exception of at a closeable insert changing station, and if necessary an insert backflushing station is also provided in the housing, and the screen wheel has a rotary drive that preferably operates in steps, and the screen wheel filter is coupled with a controller having means for presetting the rotational drive speed of the screen wheel, as well as switching means capable of closing the insert changing station and/or switching off the insert backflushing station over a predetermined number of at least two drive steps of the screen wheel.

It has proven useful that the controller comprises an timer that is coupled with the rotary drive and the switching means to enables the opening of the insert changing station and/or the switching on of the insert backflushing station after a predetermined number of cycles depending on the expected degree of contamination of the screen insert.

However, it is also possible that the controller comprises means for determining the differential pressure at the screen insert, and that the switching means enables opening of the insert changing station and/or switching on of the insert backflushing station when a predetermined differential pressure is exceeded.

BRIEF DESCRIPTION OF THE DRAWING

The invention will be explained in more detail with reference to a single FIGURE of a drawing.

SPECIFIC DESCRIPTION OF THE INVENTION

The sole FIGURE shows a screen wheel filter 1 comprising a housing 2 in which a screen wheel 3 is rotatably mounted. The screen wheel 3 is driven by a rotary drive 4 formed as a pawl drive. The screen wheel 3 comprises pawl teeth 5 for this purpose, into which the pawls 6 of the rotary drive 4 engage.

The drawing further illustrated an insert changing station 7 that is closed via a door 8. An insert backflushing station 9 can further be seen that is provided upstream from a melt passage 10 in a direction of rotation.

A controller 11 is connected both with the rotary drive 4 as well as the door 8 of the insert changing station and the insert backflushing station 9.

The controller 11 may operate the screen wheel filter 1 in such a way that the screen wheel 2 performs one or more revolutions without a change of the screen insert 12 in the insert changing station 7 or a backflushing in the insert backflushing station 9.

In the melt passage 10, pressure transducers provided upstream and downstream of a screen insert 12 provide their signals via lines 14 to the control or regulating unit 11, in which a differential pressure is determined. This differential pressure is compared with a predetermined differential pressure via the controller 11 and, when the predetermined differential pressure is exceeded, unillustrated switching means in the controller 11 is switched on so that when the screen insert 12 in which the predetermined differential pressure has been exceeded arrives in the insert changing station 7 or the insert backflushing station 9 it is changed or backflushed.

The invention claimed is:

1. A method of operating a screen wheel filter for a high-viscosity melt having pressures >10 bar and temperatures >90° C., the screen wheel filter substantially comprising
   a screen wheel mounted in a housing and carrying a plurality of angularly offset screen inserts, and
   a melt passage offset from an insert backflushing station and/or insert changing station,
the method comprising the steps of:
   rotationally indexing the screen wheel through at least one complete revolution with respect to one of the screen inserts located in the melt passage before one of the screen inserts is replaced in the insert changing station and/or backflushed in the insert backflushing station, and
   setting the drive speed and drive cycling for the screen wheel in dependence on the thermal or oxidative decomposition behavior of the particular melt such that, when any of the screen inserts enters the melt passage of the screen wheel filter for at least a second time, the melt remaining therein has experienced thermal decomposition or oxidative decomposition of ≤3% cleaved molecular chains.

2. The method according to claim 1, further comprising the step of:
   rotationally driving the screen wheel in steps by a rotary drive that ensures one revolution of the screen wheel in a time that is shorter than a time in which the melt experiences a maximum of 1% thermal or oxidative decomposition.

3. The method according to claim 2, wherein the rotary drive travels through a rotational angle of >1° and <10° per step.

4. The method according to claim 1, wherein the exchange ratio of the active screen insert surfaces to the total screen surface is >3% and <10%.

5. The method according to claim 1, further comprising the step of:
   changing and/or backflushing one of the screen inserts in dependence on the contamination of the respective screen insert.

6. The method according to claim 5, further comprising the step of:
   changing and/or backflushing the screen insert after a predetermined number of cycles in dependence on the expected degree of contamination of the screen insert.

7. The method according to claim 5, wherein the screen insert is changed and/or backflushed in dependence on a differential pressure signal in that when the differential pressure exceeds a particularly preset value, the changing and/or the backflushing is initiated for a complete revolution of the screen wheel, or even only for a fixed number of cycles or for a specific duty cycle or only for precisely the contaminated screen inserts.

8. A screen wheel filter for carrying out the method according to claim 1, wherein
   the housing is closed except at the insert changing station and at the insert backflushing station,
   the screen wheel has a rotary step drive, and
   the screen wheel filter is coupled with control means for presetting the rotational drive speed of the screen wheel, as well with switching means for closing the insert changing station and/or switching off the insert backflushing station over a predetermined number of at least two drive steps of the screen wheel.

9. The screen wheel filter according to claim 8, wherein the controller comprises timer means coupled with the rotary step drive and with the switching means for opening the insert changing station and/or switching on of the insert backflushing station after a predetermined number of cycles corresponding to the expected degree of contamination of the screen insert.

10. The screen wheel filter according to claim 8, wherein the controller comprises means for determining a differential pressure at the screen insert, and that the switching means enables the opening of the insert changing station and/or the switching on of the insert backflushing station when a predetermined differential pressure is exceeded.

* * * * *